United States Patent [19]

Wollar

[11] Patent Number: 4,648,766

[45] Date of Patent: Mar. 10, 1987

[54] PLASTIC FASTENER FOR DETACHABLY MOUNTING A PANEL ON A SUPPORT MEMBER

[75] Inventor: Burnell Wollar, Barrington, Ill.

[73] Assignee: Phillips Plastics Corporation, Phillips, Wis.

[21] Appl. No.: 806,453

[22] Filed: Dec. 9, 1985

[51] Int. Cl.[4] .............................................. F16B 13/04
[52] U.S. Cl. .......................................... 411/41; 411/45
[58] Field of Search ..................................... 411/39–41, 411/44, 45, 34–38, 508–510

[56] References Cited

U.S. PATENT DOCUMENTS

| 4,122,583 | 10/1978 | Grittner et al. | 411/44 X |
| 4,233,878 | 11/1980 | McGauran et al. | 411/510 |
| 4,375,342 | 3/1983 | Wollar et al. | 411/45 X |
| 4,393,551 | 7/1983 | Wollar et al. | 411/509 X |

Primary Examiner—Carl D. Friedman
Attorney, Agent, or Firm—James E. Nilles; Thomas F. Kirby

[57] ABSTRACT

A protective/decorative liner panel is mounted on a sheet metal support panel by molded plastic fasteners which allow the liner panel to be subsequently detached and reattached. Each fastener comprises a pin which is initially joined to a hollow grommet by a frangible web which aligns the pin shank with a bore in the grommet. The pin head is manually and twistably engageable with an installation hole in the liner panel and then the grommet is axially engaged with an installation hole in the support panel as the liner panel is moved toward the support panel. A hammer blow on the pin head fractures the web, forces the pin shank into the bore and moves the liner panel to its mounted position relative to the support panel. Serrations on the pin shank frictionally engage the bore wall to hold the pin and its attached liner panel in mounted position. First and second annular flexible resilient sealing flanges on the grommet and pin, respectively, seal the installation hole in the support panel against undesired liquid leakage. The sealing flange on the pin is large enough to encapsulate the sealing flange on the grommet when the pin shank is fully inserted in the grommet bore. The liner panel is detachable by pulling it away from the support panel and causing the pin shank to withdraw from the grommet bore, but the pin and grommet remain attached to their respective panels. The liner panel is re-attached by manually re-aligning the pin shank with the grommet bore and forcing it thereinto.

18 Claims, 8 Drawing Figures

PLASTIC FASTENER FOR DETACHABLY MOUNTING A PANEL ON A SUPPORT MEMBER

BACKGROUND OF THE INVENTION

1. Field of Use

This invention relates to a one-piece molded plastic fastener for mounting a first panel on a support member, such as another panel, so that the first panel can be detached and reattached.

The fastener comprises a pin attachable to the first panel, a hollow grommet attachable to an installation hole in the support member, a frangible web initially interconnecting the pin and grommet but enabling the pin to be forcefully inserted into and subsequently withdrawn from the hollow grommet, and sealing means for the installation hole in the support member.

2. Description of the Prior Art

Various types of prior art fasteners are known or available for detachably mounting a first panel on a support member, such as another panel. Some of these fasteners are adapted to detachably mount a decorative and/or protective liner panel on the inside of an enclosed space in a piece of equipment such as an automobile or domestic appliance. In automobiles the passenger compartment and trunk use such liners. Domestic appliances, such as refrigerators or dishwashers, also use them. The liner panel needs to be removable and replaceable to enable servicing or replacement of components therebehind. Usually, a plurality of fasteners are used to secure each liner panel to the inside of a support member which, for example, typically takes the form of a rigid stamped sheet metal support panel forming part of the automobile or appliance structure. The support panel also provides mechanical support for other components in the structure. Some fasteners are one-piece or two-piece metal or plastic devices which are screwed or press-fitted in registering attachment holes in the liner and the support panel. Some attachment holes in the support panel are in locations where there is a risk of liquids leaking therethrough from the outside of the support panel and causing damage to, deterioration of or unsightliness in the associated liner or other components. In automobiles the liquid might be rain water, water splashed from the road, wash water, gasoline, oil or other liquid automotive products. Some fasteners are provided with separate or integral sealing washers or sealing devices to prevent leakage.

U.S. Pat. No. 4,393,551 entitled "Rotatably Engaging Head For Fasteners", issued July 19, 1983 to Wollar and Schwind, and assigned to the same assignee as the present application, discloses a one-piece, injection-molded, self-sealing plastic fastener which is especially well-suited for the aforementioned purposes. This fastener has a special head which is twistably insertable manually into a pre-formed attachment hole in a liner panel and has an integral shank, with flexible resilient locking projections thereon, which is axially insertable into a registering pre-formed attachment hole in a support panel. To mount the liner panel with a plurality of such fasteners already attached thereto, the liner panel is placed adjacent the support panel in confronting relationship so that each fastener shank is axially aligned with the appropriate attachment hole in the support panel. Then, the liner panel is pressed toward the support panel to cause the fastener shanks to enter the attachment holes therein, whereupon the flexible locking projections engage the edges of the attachment holes and secure the liner panel to the support panel. The flexible locking projections enable the liner panel to be detached merely by pulling it away from the support panel, carrying the fasteners with it, and also enable the liner panel to be reinstalled, as aforedescribed. This fastener comprises an annular flexible resilient sealing flange on its shank between the head and the locking projections, which flange engages the inside surface of the support member and seals the attachment hole therein against liquid leakage when the shank is fully inserted thereinto and the liner panel is properly mounted on the support panel.

The fastener of U.S. Pat. No. 4,393,551 is satisfactory for its intended purpose, but there is a possibility that, if it is not properly installed, the sealing flange will not completely seal the attachment hole and a risk of leakage will exist. Furthermore, because the resilient flexible plastic locking projections directly slide across and engage sharp edges when inserted in an attachment hole in a support panel made of sheet metal, improper installation of the fastener or repeated insertion and withdrawal of the shank (occasioned by frequent detachment and reattachment of the liner panel) can damage the projections and render the fastener unfit to firmly secure the liner panel in place or unfit to enable an effective seal when mounted on the support panel. Therefore, there is a need for an improved fastener for this purpose.

SUMMARY OF THE INVENTION

In accordance with the invention, there is provided an improved one-piece molded plastic fastener for detachably mounting a first panel on a support member, such as a second panel. It is to be understood that the second panel has a fastener installation hole therethrough which is susceptible to undesirable fluid leakage. The fastener is especially well-adapted for use in equipment, such as automobiles or household appliances, wherein the aforementioned first panel is a detachable and reattachable decorative and/or protective liner panel, made of metal, plastic, fiber-board or the like, and wherein the second panel is a support panel, made of sheet metal, which forms part of the structure of the equipment. In practice, a plurality of fasteners are usually employed with a single liner panel.

The fastener is made in one piece of resilient flexible plastic, such as Nylon (TM) or the like, and is preferably fabricated by a one-shot injection molding process. The fastener broadly comprises a hollow grommet having a bore therethrough and having mounting means enabling it to be mountable in an installation hole in the support panel; a pin having a pin shank and a pin head connectable to the first panel, preferably by means of an installation hole in the first panel; means, such as a frangible web, for initially and releasably connecting the pin and the grommet and enabling axial insertion of the pin shank into the grommet bore, as when the frangible web is broken; first sealing means on the grommet for sealing the installation hole in the support panel when the grommet is installed therein; second sealing means on the pin for engaging the support panel and cooperating with the first sealing means, as by encapsulation thereof, to form an additional seal for the installation hole in the support panel; and interengageable means on the pin and on the grommet to maintain the pin shank inserted in the grommet bore to thereby maintain the first panel mounted on the support panel.

In a preferred embodiment of the invention, the pin head is constructed so as to be manually twistable into or out of engagement with a round (or elongated) installation hole in the first panel. Each first and second sealing means is an annular, conical, flexible, resilient sealing flange, with the second sealing flange being larger than and capable of overlying, surrounding and encapsulating the first sealing flange. The frangible web is annular in shape and integrally connected to and between the insertion end of the pin shank and the grommet edge around the grommet bore. The web initially aligns the pin shank with the grommet bore and also provides a one-piece fastener which, after fracture of the web, divides into two reusable pieces. The interengageable means which maintain the pin shank inserted in the grommet bore preferably comprise serrations on the pin shank which are frictionally engageable with the smooth, slightly resilient, deformable wall of the smaller diameter grommet bore. The frictional engagement is sufficient to maintain the pin shank firmly inserted in the grommet bore but, preferably, is not sufficient to prevent intentional withdrawal of the pin shank therefrom so as to enable the first panel to be detached from and subsequently reattached to the support panel. The grommet has flexible locking means or tabs which enable it to be secured in the installation hole in the support panel, and which, preferably, enable it to be removed therefrom if necessary or desirable.

The fastener in accordance with the invention provides several advantages over the prior art. For example, it is manufactured and initially used as a one-piece unitary fastener, thereby eliminating the costly and time-consuming need to mold, subsequently handle, store, pre-assemble and install two or more separate pieces. The pin shank is initially pre-aligned axially with the grommet bore, thereby avoiding the need to deliberately effect such alignment, at least when the fastener is first employed. The pin shank is slidably received in the smooth-bored plastic grommet mounted in the installation hole in the support panel. This prevents any sharp edges of such hole from cutting or damaging the serrations on the pin shank and avoids the need to replace it because of serration damage. The relatively long grommet bore also ensures that the pin shank will be properly inserted and supported, either initially or subsequently, and also aids in proper positioning of the first panel and proper sealing against leakage. Two seals for the installation hole in the support plate provides a very effective seal, if both seals are properly engaged. Availability of two seals also ensures that leakage will not occur, even if one seal is improperly engaged. Because the two seals are integral with the fastener itself, storage and handling of separate seals is eliminated. As will be understood, the fastener could have other uses than those specifically disclosed herein. For example, it could be fabricated so as to have a pin head of a type other than that shown for attachment to something other than a first panel. Furthermore, it could be used to mount a first panel which never needs to be detached and reattached. In such a case, the fastener could be constructed so that the pin shank could not subsequently be withdrawn from the grommet hole. Other objects and advantages of the invention will hereinafter appear.

DRAWINGS

DESCRIPTION OF PREFERRED EMBODIMENTS

Figure 1:
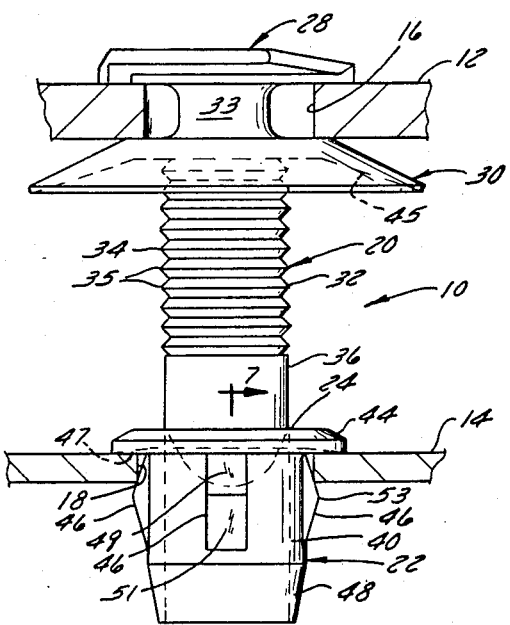
FIG. 1 is a side elevation view of a fastener according to the invention comprising a pin, a grommet and a web, and showing the fastener (with the web still intact) attached to a liner panel and to a support panel.
Figure 8:
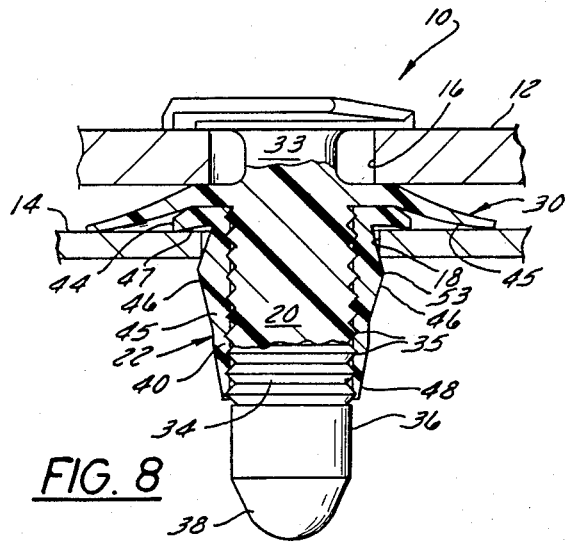
FIG. 8 is a cross-section view similar to FIG. 1 but showing the fastener and panels in fully installed condition.

In FIGS. 1 and 8, numeral 10 designates a plastic fastener according to the invention for mounting a first member or panel 12 on a second member or panel 14 in confronting relationship and in such a way that panel 12 can be detached and reattached. Panels 12 and 14 have pre-formed installation holes 16 and 18, respectively, therethrough and hole 18 is understood to be subject to fluid (liquid) leakage therethrough which could adversely affect panel 12 or components (not shown) between the panels. Fastener 10 is, therefore, further adapted to provide a dual seal to prevent such leakage.

Figure 2:
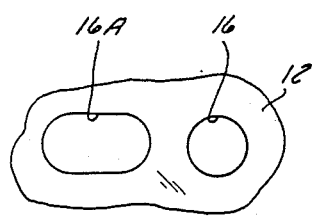
FIG. 2 is a plan view, on a reduced scale, of the liner panel of FIG. 1 and showing two different types of installation holes usable with the pin of FIG. 1.
Figure 3:
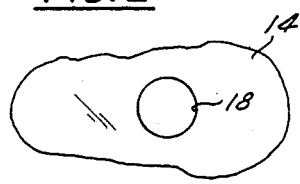
FIG. 3 is a plan view, on a reduced scale, of the support panel of FIG. 1 and showing an installation hole usable with the grommet of FIG. 1.

Panel 12 may, for example, be a decorative and/or protective panel (made of metal, plastic, fiber-board or the like) such as is used as a liner panel in a compartment in a vehicle (automobile, truck or the like) or domestic appliance (refrigerator, freezer, dishwasher or the like). Panel 14 may, for example, be a support panel (made of rigid sheet metal or the like) forming part of the structure of the vehicle or domestic appliance. Panel 12 is detachable to afford access to components (not shown) located therebehind to enable servicing and/or replacement and needs to be reattached thereafter. Installation hole 16 in panel 12 is shown as round in FIGS. 1, 2 and 8, but could be an elongated hole 16A, as shown in FIG. 2. Installation hole 18 in panel 14 is shown as round in FIGS. 1, 3 and 8.

Fastener 10 is made of plastic which is resilient, flexible and deformable, such as Nylon (TM) or the like, and is fabricated in one piece, preferably by a one-shot injection molding process. Fastener 10 comprises a pin portion or pin 20, a grommet portion or grommet 22 and a frangible web portion or web 24 which is integrally connected between pin 20 and grommet 22.

FIG. 1 shows fastener 10 attached to both panels 12 and 14, out prior to fracture of web 24 and prior to movement of liner panel 12 to its fully installed or fully mounted position relative to support panel 14. FIG. 8 shows fastener 10 attached to ooth panels 12 and 14, and after fracture of web 24 and after liner panel 12 has been moved to its fully installed or fully mounted position.

As FIGS. 1, 4, 5, 6, 7 and 8 show, pin 20 generally comprises a pin head 28, hereinafter described in detail, an annular flexible resilient sealing member 30 axially spaced from the pin head by a stem portion 33, and a cylindrical pin shank 32 having a cylindrical serrated portion 34, a cylindrical smooth guide portion 36 and a blunt tip portion 38. Grommet 22 generally comprises a cylindrical grommet shank 40 having a smooth cylindrical grommet bore 42 therethrough, an annular flexible resilient sealing member 44 around the grommet shank, a plurality (four) flexible resilient locking projections or tabs 46 on the grommet shank and axially spaced from sealing member 44, and a conical tip portion 48. Web 24 takes the form of a thin frangible annular web, formed during molding, which is connected between the end of guide portion 36 of pin 20 and the grommet 22 on a portion thereof surrounding grommet bore 42.

Figure 5:
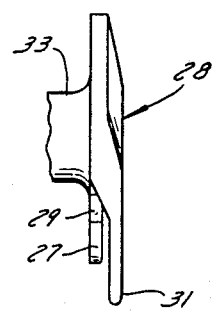
FIG. 5 is a side elevation view of another side of the head shown in FIG. 4.
Figure 4:
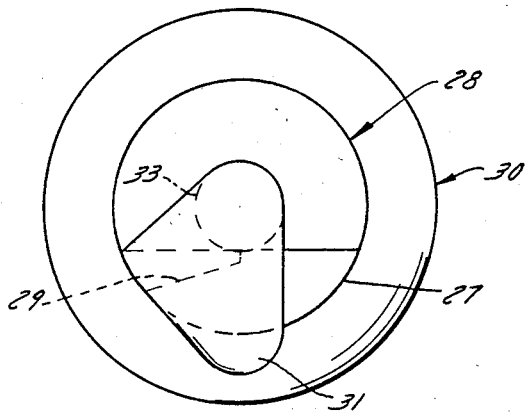
FIG. 4 is an end elevation view of the head of the pin of FIG. 1.

As FIGS. 1, 4 and 5 show, pin head 28 on pin 20 is of the same type shown in aforementioned U.S. Pat. No. 4,393,551 and enables fastener 10 to be twistably secured to and twistably removed from installation hole 16 in liner panel 12 and reference should be had to that patent for a complete description thereof. Briefly, pin head 28 had a flat circular underside 27 having a radial slit 29 therein and an integral tapered tongue 31 located above the underside 27. Tongue 31 is insertable into installation hole 16 and fastener 10 is twisted so that head 28 gradually screws into hole 16. Removal is effected by twisting in the opposite direction.

As FIGS. 1 and 8 show, the sealing members 30 and 44 are similar to each other in general configuration but member 30 is larger than member 44 in order to effect encapsulation thereof (see FIG. 8). The sealing members 30 and 44 are resilient, flexible, conically shaped, annular flange-like members having cavities 45 and 47, respectively, therein. Cavity 45 is large enough to surround and encapsulate sealing member 44. Both are adapted to engage support panel 14, as FIG. 8 shows, to seal hole 18 therein when fastener 10 is fully installed.

Each tab 46 on grommet shank 40 is a thin flexible member of generally triangular shape integrally formed on the grommet shank and having sloped edges 49 and 51 which meet at an apex 53. When the tabs are fully extended, the distance between the apices of two diametrically opposed tabs 46 is greater than the diameter of installation hole 18 in support plate 14. The fully extended tabs 46 cooperate with sealing member 44 to entrap plate 14 therebetween and maintain grommet 22 releasably installed in hole 18. The tabs 46 flex or deform to enable intentional insertion or withdrawal of grommet 22 in hole 18.

In a preferred embodiment of fastener 10, the following dimensions (in millimeters) were found satisfactory to enable fastener 10 to function properly for its intended purposes:
diameter of grommet bore 42: 5.60
diameter of pin guide portion 36: 5.60
diameter (widest point) of pin blunt tip 38: 5.10
outside diameter of serrated portion 34: 5.80
root diameter of serrated portion 34: 5.00
outside diameter of grommet sealing member 44: 12.00
maximum thickness of grommet sealing member 44: 1.20
diameter of cavity 45 in pin sealing member 30 greater than: 12.00
depth of cavity 45 in pin sealing member 30 greater than: 1.20

Fastener 10 is employed as follows. Assume that fastener 10 is in the condition shown in FIG. 1 and that web 24 is intact. The fastener is manually gripped and its pin head 28 is manually inserted and installed by twisting in installation hole 16 in liner panel 12 so that it is connected to liner panel 12 as shown in FIG. 1. Then, liner panel 12 is disposed in confronting parallel relationship to support panel 14 so that conical tip portion 48 of grommet 22 is axially aligned with insertion hole 18 in support panel 14. Liner panel 12 with fastener 10 attached thereto is then moved toward support panel 14 so that grommet 22 is inserted and installed by axial insertion in installation hole 18 in support panel 14, as shown in FIG. 1. In particular, the conical grommet tip portion 48 of grommet 22 enters hole 18, the locking tabs 46 flex, enter hole 18 from one side and exit the other, and then flex back to the position shown in FIG. 1. Thus, support panel 14 is entrapped between sealing member 44 and the locking tabs 46. Such installation of grommet 22 causes sealing member 44 to flex and resiliently engage the side of support panel 14 closest to liner panel 12 and effect an annular fluid-tight seal around installation hole 18.

At the stage of assembly shown in FIG. 1, fastener 10 is attached to both panels and liner panel 12 is temporarily supported on support panel 14 but is not yet in its final mounting position shown in FIG. 8. Web 24 of fastener 10 is still unfractured and intact and pin 20 is not yet inserted into bore 42 of grommet 22.

Figure 7:
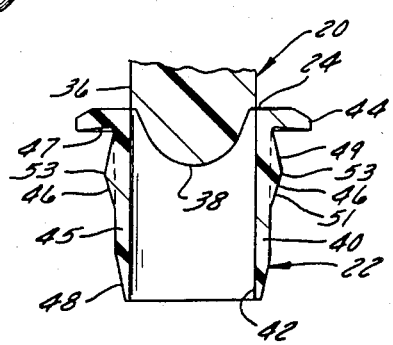
FIG. 7 is an enlarged cross-section view of the grommet taken on line 7—7 of FIG. 1.
Figure 6:
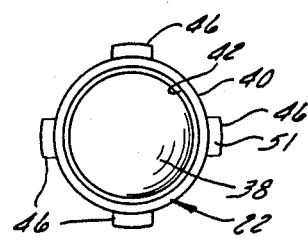
FIG. 6 is an end elevation view of the insertion end of the grommet of FIG. 1.

Now assume that fastener 10 and the panels 12 and 14 are in the relative positions and conditions shown in FIG. 1. As FIG. 7 shows, blunt tip 38 of pin 20 already extends into bore 42 of grommet 22, but the smooth pin guide portion 36 does not. In order to effect movement of liner panel 12 to its fully installed position shown in FIG. 8, a strong blow is delivered to pin head 28, as by means of a hammer or mallet, to effect axial movement of pin 20 toward grommet 22. As this pin movement commences, web 24 fractures and smooth guide portion 36 of pin 20 slidably enters smooth grommet bore 42, being guided for such entry, if necessary, by blunt tip 38. As pin movement continues, serrated portion 34 of pin 20 enters and is inserted into grommet bore 42, being guided by pin guide portion 36. Although the outside diameter of serrated portion 34 is larger than that of bore 42, the serration tips 35 and wall 45 of the bore are sufficiently flexible, resilient and compressible to enable such entry, if the blow is forceful enough.

As FIG. 8 shows, when pin 20 reaches its fully inserted position, sealing member 30 thereon overlies, surrounds and encapsulates sealing member 44 of grommet 22 and engages the side of support panel 14 closest to liner panel 12 and effects an additional of back-up annular fluid-tight seal around installation hole 18 in support panel 14. FIG. 8 also shows that liner panel 12 is then in fully mounted position relative to support panel 14. Liner panel 12 is maintained in fully mounted position and pin 20 is maintained in fully inserted position because, as FIG. 8 shows, the serration tips 35 dig into and frictionally engage resilient wall 45 of plastic grommet bore 42 with sufficient force to prevent unintentional axial withdrawal of pin 20.

Liner panel 12 can be detached from support panel 14 by manually pulling it away from support panel 14 with sufficient force to overcome the aforementioned force of frictional engagement and effect complete axial withdrawal of pin shank 32 from grommet bore 42. The flexibility, resiliency and deformability of the plastic of fastener 10 enable this to occur. However, when the panels 12 and 14 are detached from each other, pin 20 and grommet 22 remain attached to the panels 12 and 14, respectively.

Liner panel 12 can be reattached to or remounted on support panel 14 as follows. The liner panel 12, with pin 20 still attached thereto is disposed in confronting parallel relationship to support panel 14 on which grommet 22 is still attached. Blunt tip portion 38 of pin 20 is aligned with and inserted into grommet bore 42 and it guides pin guide portion 36 into grommet bore 42 as liner panel 12 is moved toward support panel 14. At this stage, a hammer blow is delivered to head 28 of pin 20 and guide portion 36, in turn, guides serrated portion 34 of pin 20 into grommet bore 42, as hereinbefore described.

If it so happens that either pin 20 or grommet 22 or both are damaged and unsuitable for use, each may be removed from its associated panel, while the panels are detached from one another, and a new fastener 10 may be installed. Removal of pin 20 from its installation hole 16 in liner panel 12 is effected by twisting it in the direction reverse to its installation direction. Removal of grommet 22 from its installation hole 18 in support panel 14 is effected by pulling on it axially (by means of sealing member 44) with sufficient force to cause the locking tabs 46 to flex and bend relative to grommet shank 40 and pass through hole 18.

I claim:

1. A fastener for releasably mounting one member on another member in fixed spaced apart relationship and for sealing an installation hole in said other member, said fastener comprising:

a hollow grommet for releasable installation in said installation hole, said hollow grommet having a bore therein defined by a resilient deformable bore wall;

a pin attachable to said one member and having a shank insertable into said bore in said hollow grommet;

means for initially connecting said pin and said hollow grommet in predetermined positions relative to each other but enabling subsequent insertion of said shank of said pin into said hollow grommet after said pin is attached to said one member and said grommet is inserted in said installation hole;

means on said shank of said pin engageable with said bore wall for releasably maintaining said shank of said pin inserted in said bore of said hollow grommet to thereby maintain said one member mounted on said other member in fixed spaced apart relationship and for sealing said bore;

and sealing means for said installation hole comprising a resilient flexible first sealing member on said hollow grommet engageable with said other member to seal said installation hole and a resilient flexible second sealing member on said pin for encapsulating said first sealing member and engageable with said other member to further seal said installation hole.

2. A fastener according to claim 1 wherein said means for initially connecting said pin and said hollow grommet is a frangible means integrally connected to said pin and to said hollow grommet.

3. A one-piece fastener for mounting one member on another member in fixed spaced apart relationship and for sealing an installation hole in said other member, said fastener comprising:

a hollow grommet for installation in said installation hole and having a grommet bore therethrough defined by a resilient deformable bore wall;

a pin attachable to said one member and having a shank insertable into said grommet bore;

frangible means integrally connected between said pin and said hollow grommet for initially maintaining said pin shank aligned with said grommet bore and frangible to enable subsequent insertion of said pin shank into said grommet bore;

means on said pin shank for engaging said bore wall in said grommet for maintaining said one member mounted on said other member in fixed spaced apart relationship and for sealing said bore;

a resilient flexible first sealing member on said hollow grommet engageable with said other member for sealing said installation hole;

and a resilient flexible second sealing member on said pin engageable with said other member when said pin shank is inserted in said grommet bore for encapsulating said first sealing means and for further sealing said installation hole.

4. A fastener according to claim 3 wherein said means on said pin shank for engaging said bore wall releasably maintains said pin shank in said grommet bore and enables subsequent withdrawal of said pin shank from each grommet bore to thereby enable said one member to be detached from said other member.

5. A fastener according to claim 4 wherein said means on said pin shank comprises at least one serration on said pin shank which frictionally engages a portion of said bore wall of said grommet bore in sealing relationship.

6. A fastener according to claim 3 or 4 or 5 wherein said pin comprises a head which is releasably installable in an installation hole in said one member.

7. A fastener according to claim 3 or 4 or 5 wherein said hollow grommet comprises at least one resilient flexible locking tab which cooperates with said first sealing member on said hollow grommet to maintain said hollow grommet secured in said installation hole in said other member.

8. A fastener according to claim 7 wherein said flexible locking tab enables removal of said hollow grommet from said installation hole in said other member.

9. A one-piece molded plastic fastener for detachably mounting one member on another member in fixed spaced apart relationship and for sealing an installation hole in said other said member, said fastener comprising:

a pin having an attachment head adapted to be secured to said one member, a pin shank, at least one serration on said shank, and a first annular flexible resilient sealing flange between said attachement head and said one serration;

a hollow grommet adapted to be secured in said installation hole in said other member and having a pin-shank receiving grommet bore therethrough, locking means on the exterior of said hollow grommet for securing said grommet in said installation hole and a second annular flexible resilient sealing flange on said hollow grommet and axially spaced from said locking means so as to accommodate said other member therebetween, said grommet bore having a resilient deformable bore wall frictionally engageable with said one serration to seal said bore and to maintain said pin in a predetermined fixed position relative to said hollow grommet, and said second sealing flange being smaller than said first sealing flange so as to be encapsulatable thereby so that said second sealing means and said first sealing means can both seal said installation hole in said other member;

and an integrally formed frangible portion connected between said pin and said hollow grommet for releasably maintaining said pin shank in axial alignment with said grommet bore prior to full insertion of said pin shank in said grommet bore.

10. A fastener according to claim 9 wherein said frangible portion is connected between said pin shank near an end thereof and said grommet near an end thereof.

11. A fastener according to claim 9 wherein said attachment head is adapted to be secured in an installation hole in said one member.

12. A fastener acording to claim 9 wherein said first sealing flange is axially spaced apart from said attachment head of said pin so as to accommodate said one member therebetween.

13. A fastener according to claim 9 or 10 or 11 or 12 wherein said locking means on the exterior of said grommet comprises at least one flexible resilient locking tab cooperable with said second sealing flange to entrap said other member therebetween.

14. A fastener according to claim 13 wherein said serration on said pin shank has a larger diameter than said grommet bore and wherein said pin shank has an unserrated portion between said one serration and said grommet of substantially the same diameter as said grommet bore.

15. A fastener according to claim 14 wherein said frangible portion is connected between said unserrated portion of said pin shank and said grommet.

16. A plastic fastener for detachably mounting a first panel in confronting spaced apart fixed relationship on a second panel, said fastener comprising:

a pin, a hollow grommet and a frangible web for initially connecting said pin and said hollow grommet together in axial alignment;

said pin comprising a pin shank having a plurality of axially spaced apart annular serrations thereon and a head which enables one end of said fastener to be twistably secured to a pin installation hole in said first panel;

said grommet comprising a first flexible sealing flange for sealing said grommet installation hole against liquid flow therethrough when said grommet is installed therein;

said grommet having a pin-receiving bore therethrough into which said pin shank is insertable and comprising flexible projections on its exterior cooperable with said first sealing flange to enable the other end of said fastener to be secured to a grommet installation hole in said second panel;

said pin further comprising a second flexible sealing flange, larger than said first flexible sealing flange and engaging said first panel to provide an additional seal for said grommet installation hole when said frangible web is broken and said pin shank is axially inserted into said pin-receiving bore of said grommet;

said serrations on said pin shank being adapted to frictionally engage the wall of said pin-receiving bore to releasably secure said pin shank therein to thereby maintain said first panel mounted on said second panel and to seal said bore.

17. A one-piece reusable plastic fastener for releasably mounting a first panel in fixed spaced apart relationship to a second panel and for sealing a grommet installation hole in said second panel, said fastener comprising:

a pin releasably mountable in a pin installation hole in said first panel, said pin having a pin head for insertion in said pin installation hole, said pin having a first annular flexible sealing member axially spaced from said first panel therebetween, and said pin having a pin shank with at least one serration therearound;

a hollow grommet releasably mountable in said grommet installation hole in said second panel, said grommet having a second annular flexible sealing member, said grommet having flexible locking means axially spaced from said second sealing member and cooperable therewith to entrap said second panel therebetween and to cause said second sealing member to seal said grommet installation hole in said second panel, said grommet having a pin shank receiving bore therein defined by a resilient deformable bore wall;

and integrally formed frangible means connected between said pin and said grommet for initially maintaining said pin shank in a pre-inserted position relative to said bore in said grommet while said fastener is mounted in the installation holes in both panels, said frangible means being frangible as said panels are relatively moved toward each other while said fastener is mounted on both panels to enable said pin shank to be axially inserted into said bore in said grommet to a fully installed position wherein said serration on said pin shank frictionally engages said resilient deformable bore wall in said grommet to seal said bore against fluid flow therethrough and to releasably secure said pin shank in said fully installed position to thereby maintain said panels in fixed spaced apart position and wherein said first sealing member on said pin encapsulates said second sealing member on said grommet and effects further sealing of said installation hole in said second panel.

18. A fastener according to claim 17 wherein said pin head is twistably insertable in said pin installation hole in said first panel.

* * * * *